(12) United States Patent
Harris

(10) Patent No.: US 10,337,339 B2
(45) Date of Patent: Jul. 2, 2019

(54) STRUCTURAL HONEYCOMB PANEL

(71) Applicant: United Technologies Corporation, Farmington, CT (US)

(72) Inventor: Meggan Harris, Colchester, CT (US)

(73) Assignee: United Technologies Corporation, Farmington, CT (US)

( * ) Notice: Subject to any disclaimer, the term of this patent is extended or adjusted under 35 U.S.C. 154(b) by 197 days.

(21) Appl. No.: 15/028,129

(22) PCT Filed: Dec. 9, 2014

(86) PCT No.: PCT/US2014/069289
§ 371 (c)(1),
(2) Date: Apr. 8, 2016

(87) PCT Pub. No.: WO2015/130377
PCT Pub. Date: Sep. 3, 2015

(65) Prior Publication Data
US 2016/0237836 A1 Aug. 18, 2016

Related U.S. Application Data

(60) Provisional application No. 61/915,073, filed on Dec. 12, 2013.

(51) Int. Cl.
*B32B 3/30* (2006.01)
*F01D 9/02* (2006.01)
(Continued)

(52) U.S. Cl.
CPC .............. *F01D 9/02* (2013.01); *B22F 3/1055* (2013.01); *B22F 5/10* (2013.01); *F01D 25/12* (2013.01);
(Continued)

(58) Field of Classification Search
CPC ................................................ Y10T 428/1234
See application file for complete search history.

(56) References Cited

U.S. PATENT DOCUMENTS 4,716,067 A * 12/1987 Moji ..................... B29C 70/865
428/117
5,160,248 A 11/1992 Clarke
(Continued)

FOREIGN PATENT DOCUMENTS

| GB | 2452476 A | 3/2009 |
|----|-----------|--------|
| JP | H06106662 A | 4/1994 |

OTHER PUBLICATIONS

Transmittal of International Preliminary Report on Patentability, dated Jun. 23, 2016, for PCT Application No. PCT/US2014/069289, 9 pages.

(Continued)

*Primary Examiner* — Adam Krupicka
(74) *Attorney, Agent, or Firm* — Kinney & Lange, P.A.

(57) ABSTRACT

A structural panel for use with a gas turbine engine includes a first exterior wall, a second exterior wall, and interior walls. The first exterior wall includes a first exterior surface and a first interior surface parallel to the first exterior surface. The second exterior wall includes a second exterior surface and a second interior surface parallel to the second exterior surface. The interior walls extend from the first interior surface to the second interior surface. The interior walls are arranged to form a pattern of hexagonal cells. The pattern of hexagonal cells includes cell groups having a variation in structural strength such that at least one of the cell groups has a structural strength that is not the same as the remaining cell groups.

15 Claims, 3 Drawing Sheets

(51) Int. Cl.
    *F01D 25/12* (2006.01)
    *F01D 25/24* (2006.01)
    *B22F 3/105* (2006.01)
    *B22F 5/10* (2006.01)
    *F02C 7/24* (2006.01)
    *F02K 1/82* (2006.01)
    *B22F 5/00* (2006.01)
    *B33Y 10/00* (2015.01)
    *B33Y 80/00* (2015.01)

(52) U.S. Cl.
    CPC ............... *F01D 25/24* (2013.01); *F02C 7/24* (2013.01); *F02K 1/822* (2013.01); *B22F 5/009* (2013.01); *B22F 2207/11* (2013.01); *B33Y 10/00* (2014.12); *B33Y 80/00* (2014.12); *F05D 2220/32* (2013.01); *F05D 2230/22* (2013.01); *F05D 2230/31* (2013.01); *F05D 2230/53* (2013.01); *F05D 2250/132* (2013.01); *F05D 2250/283* (2013.01); *F05D 2250/314* (2013.01); *F05D 2260/202* (2013.01); *Y02P 10/295* (2015.11); *Y02T 50/671* (2013.01); *Y02T 50/675* (2013.01)

(56) References Cited

U.S. PATENT DOCUMENTS

| | | | |
|---|---|---|---|
| 5,445,861 A | * | 8/1995 | Newton .................... B32B 3/12 |
| | | | 428/116 |
| 5,743,488 A | | 4/1998 | Rolston et al. |
| 5,785,919 A | | 7/1998 | Wilson |
| 6,122,892 A | | 9/2000 | Gonidec et al. |
| 7,977,600 B2 | | 7/2011 | Wood |
| 8,367,183 B2 | | 2/2013 | Take et al. |
| 2010/0192590 A1 | | 8/2010 | Johnson et al. |
| 2011/0282452 A1 | | 11/2011 | Koerner et al. |
| 2011/0309556 A1 | | 12/2011 | Lauwers |

OTHER PUBLICATIONS

Written Opinion and International Search Report, for PCT No. PCT/US2014/069289, dated Aug. 27, 2015, 24 pages.

Extended European Search Report, for European Patent Application No. 14883752.9, dated Dec. 16, 2016, 8 pages.

International Search Report and Written Opinion, International Application No. PCT/US2014/069289, dated Aug. 27, 2015, 10 pages.

\* cited by examiner

STRUCTURAL HONEYCOMB PANEL

BACKGROUND

The present invention relates to panels for use in gas turbine engine, and in particular to honeycomb panels. Honeycomb panels generally have a relatively high strength for their weight. Honeycomb panels may be used throughout aircraft. Metal honeycomb panels may be employed in several locations in a gas turbine engine to line a flow path containing hot gases, for example in a nozzle assembly downstream of a turbine.

Although metal honeycomb panels are inherently strong for their weight, additional reductions in weight without reducing strength are strongly desired for improved fuel economy. In addition, the current state of the art method of manufacturing a metal honeycomb panel is complex and expensive. Individual hexagonal tubes must be assembled, and then brazed or welded together to create the honeycomb pattern. The honeycomb pattern must then be brazed or welded to two sheet metal sections to produce the final panel. A less complex and more economical method of manufacturing a metal honeycomb panel is desired.

SUMMARY

An embodiment of the present invention is a structural panel for use with a gas turbine engine. The panel includes a first exterior wall, a second exterior wall, and interior walls. The first exterior wall includes a first exterior surface and a first interior surface parallel to the first exterior surface. The second exterior wall includes a second exterior surface and a second interior surface parallel to the second exterior surface. The interior walls extend from the first interior surface to the second interior surface. The interior walls are arranged to form a pattern of hexagonal cells. The pattern of hexagonal cells includes cell groups having a variation in structural strength such that at least one of the cell groups has a structural strength that is not the same as the remaining cell groups.

Another embodiment of the present invention is a method for making a structural panel. The method includes building the structural panel by a layer-by-layer additive manufacturing process. The method includes forming, while building the structural panel, a first exterior wall, and a second exterior wall. The method also includes integrally forming a pattern of hexagonal cells defined by interior walls extending between the first exterior wall and the second exterior wall. The pattern of hexagonal cells includes a plurality of cell groups having a variation in structural strength such that at least one of the cell groups has a structural strength that is not the same as the remaining cell groups.

DETAILED DESCRIPTION

Figure 1:
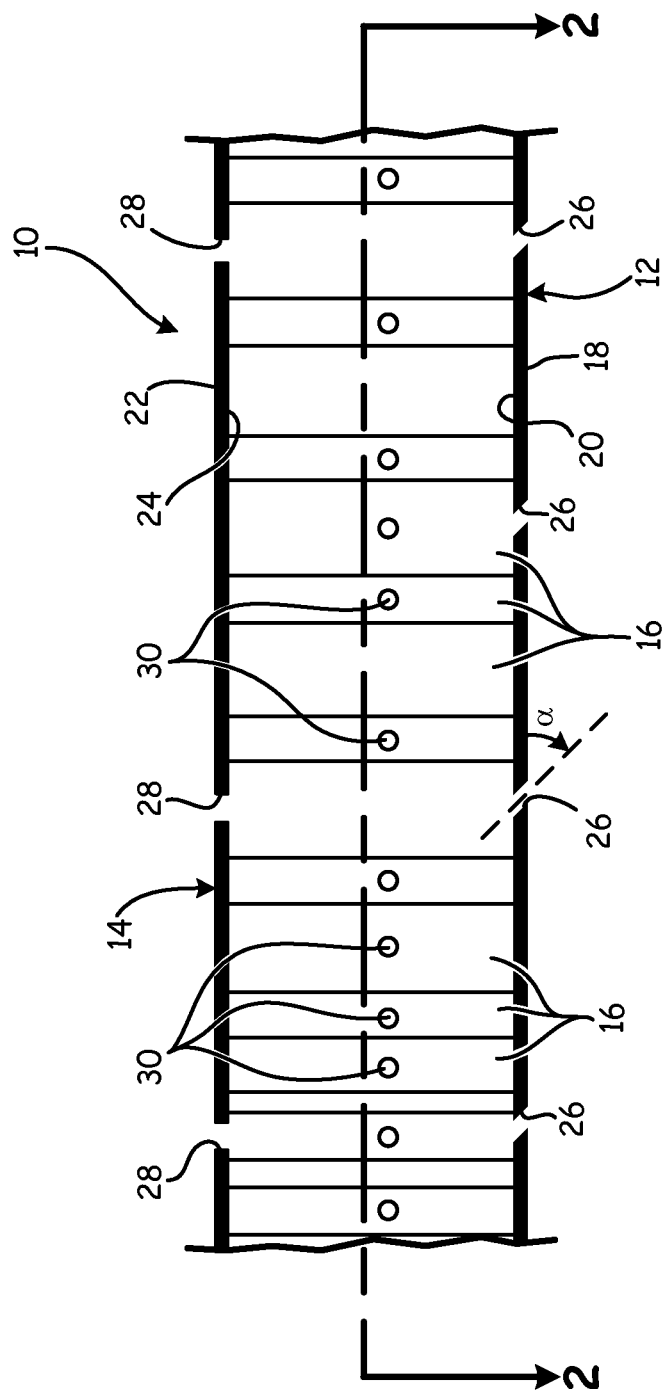
FIG. 1 is a side cross-sectional view of a structural panel.

FIG. 1 is a side cross-sectional view of structural panel 10. FIG. 1 shows a section of structural panel 10 including first exterior wall 12, second exterior wall 14, and interior walls 16. First exterior wall 12 includes first exterior surface 18, and first interior surface 20. Second exterior wall 14 includes second exterior surface 22, and second interior surface 24. Interior walls 16 extend from first interior surface 20 to second interior surface 24.

In some embodiments, such as the one illustrated in FIG. 1, structural panel 10 includes features for providing for a flow of cooling air through structural panel 10 to protect it from hot gases generated within a gas turbine engine. In FIG. 1, first exterior wall 12 is designed to be exposed hot gases. Thus, first exterior wall 12 further includes effusion cooling holes 26 which extend through first exterior wall 12 between first exterior surface 18 and first interior surface 20. Effusion cooling holes 26 are designed to pass relatively cool air along first exterior surface 18. In effusion cooling, the cool air passed by effusion cooling holes 26 preferably forms a cooling film, which prevents direct convective thermal transfer between hot gases and structural panel 10. Effusion cooling holes 26 form a shallow angle α with first exterior surface 18 to aid in formation of a cooling film along first exterior surface 18, providing thermal protection for first exterior wall 12.

The relatively cool air required for effusion cooling is provided at second exterior wall 14. Second exterior wall 14 further includes cooling air holes 28 extending through second exterior wall 14 between second exterior surface 22 and second interior surface 24 to permit cooling air to flow into structural panel 10. Cooling air holes 28 may be larger than effusion cooling holes 26, so a single cooling air hole 28 may supply many effusion cooling holes 26. As shown in FIG. 1, some of interior walls 16 include at least one aperture 30. Aperture 30 is a hole in interior wall 16 through which cooling air may pass from cooling air hole 28 to effusion cooling holes 26.

Figure 2:
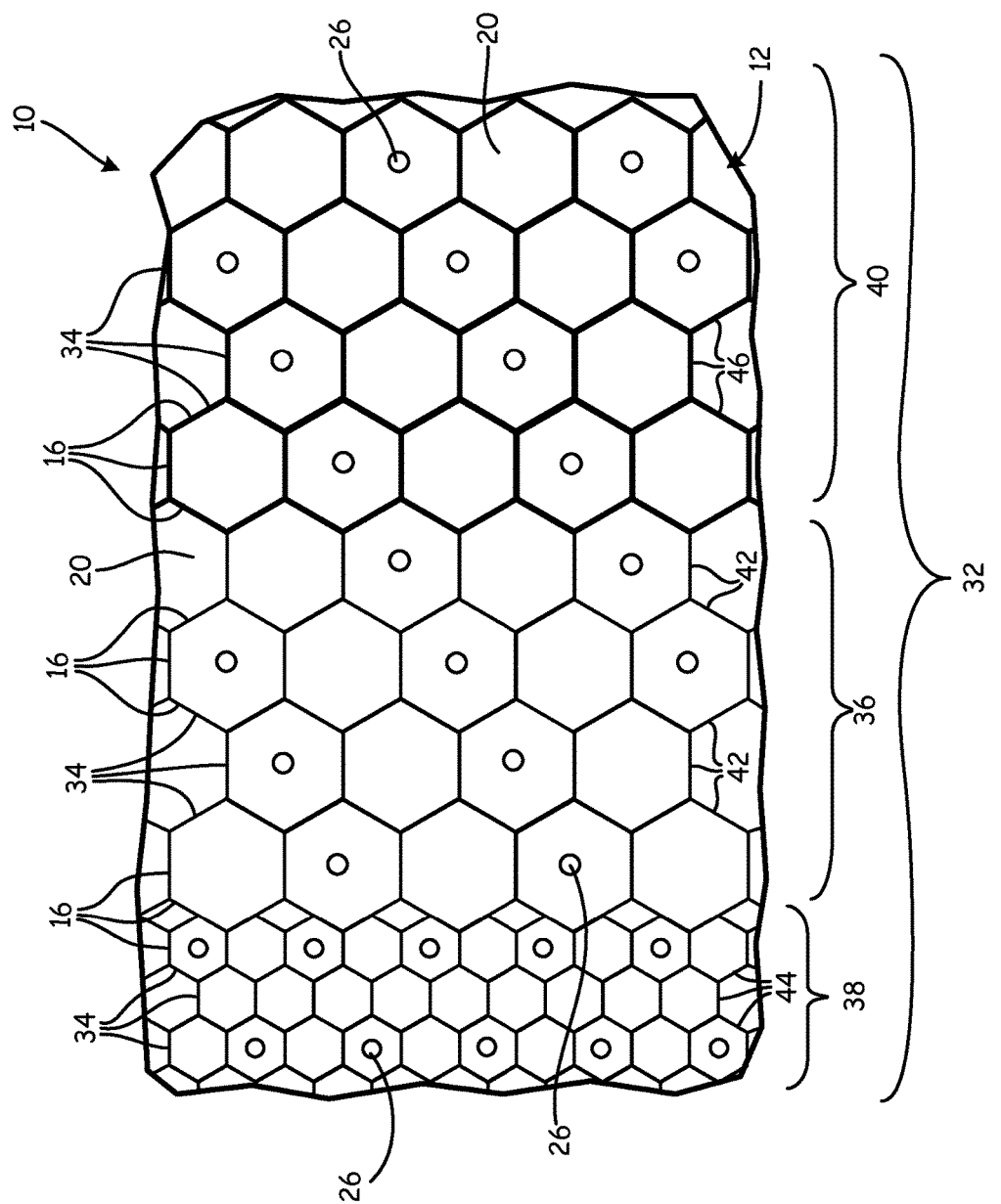
FIG. 2 is a top cross-sectional view of the structural panel of FIG. 1.

FIG. 2 is a top cross-sectional view of the structural panel of FIG. 1. FIG. 2 shows that internal walls 16 are arranged to form pattern 32 of hexagonal cells 34. A pattern of hexagonal cells is also referred to as a honeycomb pattern. Pattern 32 includes cell group 36, cell group 38, and cell group 40. Cell group 36 is made up of cell type 42. Cell group 38 is made up of cell type 44. Cell group 40 is made up of cell type 46. Cell type 44 of cell group 38 is smaller than cell type 42 of cell group 36, thus cell group 38 is more densely packed than cell group 36. As a result, even though cell type 44 is identical to cell type 42 in all other respects, cell group 38 is structurally stronger than cell group 36. The higher density does increase the weight of structural panel 10 in the region of cell group 38.

Cell type 46 of cell group 40 is formed of interior walls 16 that are thicker than those forming cell type 42 of cell group 36. As a result, even though cell type 46 is identical to cell type 42 in all other respects, cell group 40 is structurally stronger than cell group 36. The thicker interior walls 16 of cell type 46 increase the weight of structural panel 10 in the region of cell group 40

Thus, pattern 32 includes a plurality of cell groups (cell group 36, cell group 38, and cell group 40) having a variation in structural strength, such that at least one of the cell groups has a structural strength that is not the same as the remaining cell groups. In the specific embodiment of FIG. 2, while it is possible that cell group 38 and cell group 40 may have the same structural strength, both have a greater structural strength than cell group 36. Thus, cell group 36 has a structural strength that is not the same as the remaining cell groups.

The embodiment describe above is advantageous as it permits tailoring a structural panel for additional structural strength where needed, for example, portions of structural panel 10 strengthened by cell group 38 and cell group 40, while enjoying the lighter weight afforded by cell group 36 elsewhere on structural panel 10.

FIG. 2 further illustrates that effusion cooling holes 26 may be found in some, but not all, of hexagonal cells 34. As noted above, cooling air holes 28 (FIG. 2) may be larger than effusion cooling holes 26, so a single cooling air hole 28 may supply many effusion cooling holes 26. Flow paths may be tailored to direct cooling air from cooling air hole 28 (FIG. 1), through hexagonal cells 34 that do not have effusion cooling holes 26, and to hexagonal cells 34 having effusion cooling holes 26.

Figure 3:
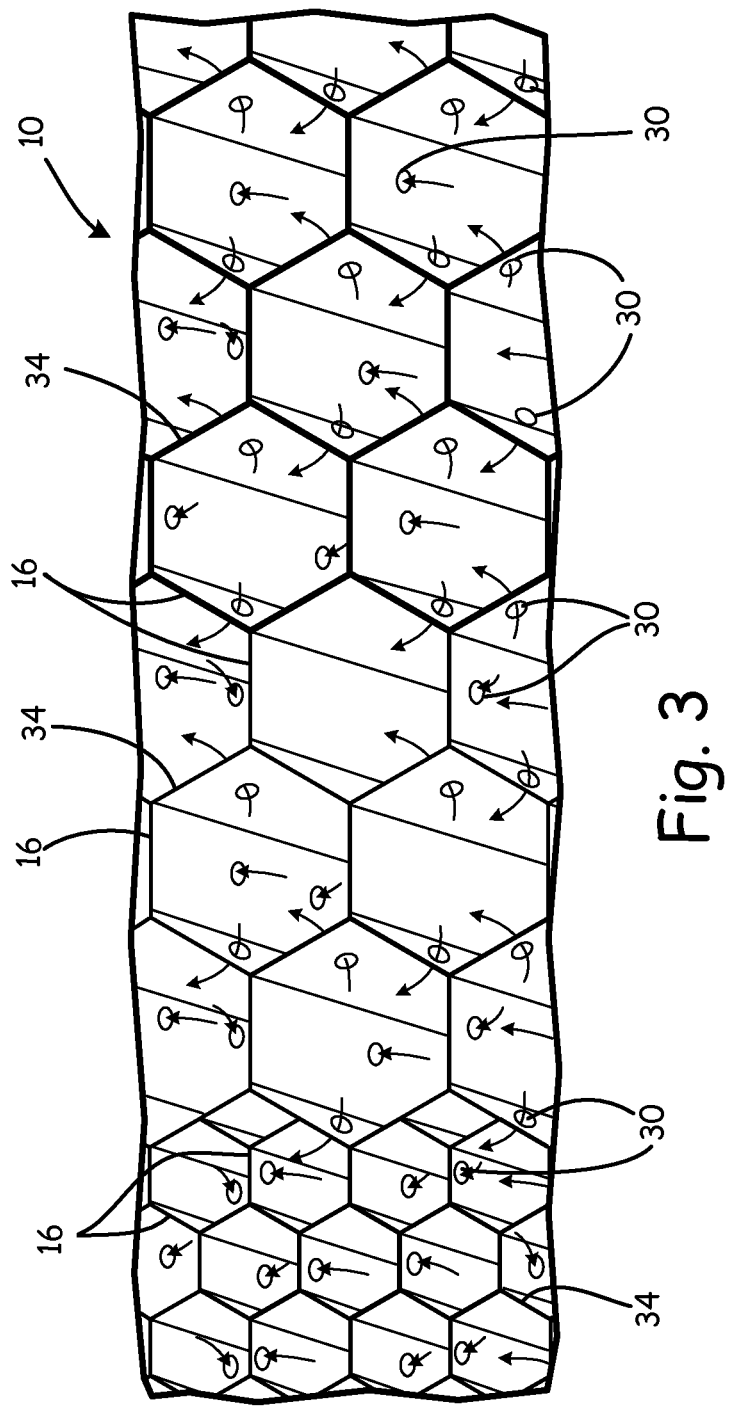
FIG. 3 is an angled perspective view of a portion of the structural panel shown in FIG. 2.

FIG. 3 is an angled perspective view of a portion of structural panel 10 shown in FIG. 2. As also noted above, some of interior walls 16 include at least one aperture 30 through which cooling air may pass. This is shown in greater detail in FIG. 3. As shown in FIG. 3, some of interior walls 16 have one aperture 30, others more than one aperture 30, and still others, no aperture 30. Considering FIGS. 1, 2, and 3 together, apertures 30 and interior walls 16 may be arranged to create a plurality of flow paths (shown by arrows in FIG. 3) between cooling air hole 28 and effusion cooling holes 26. Tailoring the flow paths with apertures 30 and interior walls 16 also permits directing more cooling air to areas of structural panel 10 which may require additional cooling due to additional mass, for example, cell group 38 and cell group 40.

Additive manufacturing processes allow the complex, tailored geometries of structural panel 10 to be realized. An example of such an additive manufacturing process is described in U.S. patent application Ser. No. 13/869,042, "COMBUSTOR COMPONENT WITH COOLING HOLES FORMED BY ADDITIVE MANUFACTURING" assigned to United Technologies Corporation, incorporated herein by reference. First exterior wall 12, second exterior wall 14, and interior walls 16 are integrally formed together as a stack of layers of material during an additive manufacturing process. In additive manufacturing, complexities, such as cell groups 36, 38, 40 having a variation in structural strength, and tailored flow paths by arrangement of internal walls 16 and apertures 30, present no additional difficulties in producing structural panel 10. The additive manufacturing process may include laser powder deposition or direct metal laser sintering. Structural panel 10 may be made of a titanium alloy or a nickel-base alloy, for example, a high-temperature super alloy. The use of additive manufacturing eliminates the need for brazing or welding together individual hexagonal tubes and brazing or welding the honeycomb pattern to metal sheets. As a result, significant cost savings are realized, both in labor, and in materials.

A structural panel embodying the present invention provides for reductions in weight compared with prior art metal honeycomb panels by forming a pattern of hexagonal cells that includes cell groups having a variation in cell strength. Tailoring the hexagonal pattern in this way limits the use of stronger, heavier cell groups to portions of the structural panel where such strength is needed. Tailoring the flow path of cooling air through internal walls forming the hexagonal cells provides for better cooling and greater longevity of the structural panel. Additively manufacturing the structural panel provides additional weight and cost savings.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

Discussion of Possible Embodiments

The following are non-exclusive descriptions of possible embodiments of the present invention.

A structural panel for use with a gas turbine engine includes a first exterior wall, a second exterior wall, and a plurality of interior walls. The first exterior wall includes a first exterior surface, and a first interior surface parallel to the first exterior surface. The second exterior wall includes a second exterior surface, and a second interior surface parallel to the second exterior surface. The plurality of interior walls extend from the first interior surface to the second interior surface. The interior walls arranged to form a pattern of hexagonal cells. The pattern of hexagonal cells includes a plurality of cell groups having a variation in structural strength such that at least one of the cell groups has a structural strength that is not the same as the remaining cell groups.

The structural panel of the preceding paragraph can optionally include, additionally and/or alternatively, any one or more of the following features, configurations, and/or additional components:

the variation in structural strength corresponds to a variation in cell size;

the variation in structural strength corresponds to a variation in interior wall thickness;

the first exterior wall further includes a plurality of effusion cooling holes extending through the first exterior wall between the first interior surface and the first exterior surface at a shallow angle to the first exterior surface, and the second exterior wall further includes at least one cooling air hole extending through the second exterior wall between the second interior surface and the second exterior surface;

some of the interior walls each include an aperture, and the interior walls and apertures are arranged to create a plurality of flow paths between the at least one cooling air hole and the effusion cooling holes;

the first exterior wall, the second exterior wall, and the plurality of interior walls are integrally formed as a stack of layers of material;

the material is a sintered metal; and the material is a nickel alloy.

A method for making a structural panel includes building the structural panel by a layer-by-layer additive manufacturing process. The method also includes forming, while building the structural panel, a first exterior wall, and a second exterior wall. The method also includes integrally forming a pattern of hexagonal cells defined by interior walls extending between the first exterior wall and the second exterior wall. The pattern of hexagonal cells includes a plurality of cell groups having a variation in structural strength such that at least one of the cell groups has a structural strength that is not the same as the remaining cell groups.

The method of the preceding paragraph can optionally include, additionally and/or alternatively, any one or more of the following features, configurations, and/or additional components:

the variation in structural strength corresponds to a variation in cell size;

the variation in structural strength corresponds to a variation in interior wall thickness;

forming the first exterior wall further includes forming a plurality of effusion cooling holes extending through the first exterior wall at a shallow angle to the first exterior wall, and forming a plurality of cooling air holes extending through the second exterior wall;

integrally forming a pattern of hexagonal cells includes forming an aperture in each of some of the interior walls, creating a plurality of flow paths between the cooling air holes and the effusion cooling holes;

additively manufacturing includes using laser powder deposition; and additively manufacturing includes using direct metal laser sintering.

The invention claimed is:

1. A structural panel for use with a gas turbine engine, the panel comprising:
 a first exterior wall including:
  a first exterior surface; and
  a first interior surface parallel to the first exterior surface;
 a second exterior wall including:
  a second exterior surface; and
  a second interior surface parallel to the second exterior surface; and
 a plurality of interior walls extending from the first interior surface to the second interior surface, the interior walls arranged to form a pattern of hexagonal cells, wherein some interior walls include one aperture, some interior walls includes more than one aperture, and some interior walls include no apertures;
 wherein the pattern of hexagonal cells includes a plurality of cell groups having a variation in structural strength such that at least one of the cell groups has a structural strength that is not the same as the remaining cell groups.

2. The structural panel of claim 1, wherein the variation in structural strength corresponds to a variation in cell size.

3. The structural panel of claim 1, wherein the variation in structural strength corresponds to a variation in interior wall thickness.

4. The structural panel of claim 1, wherein the first exterior wall further includes a plurality of effusion cooling holes extending through the first exterior wall between the first interior surface and the first exterior surface at a shallow angle to the first exterior surface; and the second exterior wall further includes at least one cooling air hole extending through the second exterior wall between the second interior surface and the second exterior surface.

5. The structural panel of claim 4, wherein the interior walls and apertures are arranged to create a plurality of flow paths between the at least one cooling air hole and the effusion cooling holes.

6. The structural panel of claim 1, wherein the first exterior wall, the second exterior wall, and the plurality of interior walls are integrally formed as a stack of layers of material.

7. The structural panel of claim 6, wherein the material is a sintered metal.

8. The structural panel of claim 6, wherein the material is a nickel alloy.

9. A method for making the structural panel of claim 1, the method comprising:
 building the structural panel by a layer-by-layer additive manufacturing process;
 forming, while building the structural panel, the first exterior wall, and the second exterior wall; and
 integrally forming the pattern of hexagonal cells defined by interior walls extending between the first exterior wall and the second exterior wall.

10. The method of claim 9, wherein the variation in structural strength corresponds to a variation in cell size.

11. The method of claim 9, wherein the variation in structural strength corresponds to a variation in interior wall thickness.

12. The method of claim 9, wherein forming the first exterior wall further includes:
 forming a plurality of effusion cooling holes extending through the first exterior wall at a shallow angle to the first exterior wall; and
 forming a plurality of cooling air holes extending through the second exterior wall.

13. The method of claim 12, wherein integrally forming a pattern of hexagonal cells includes forming one aperture in each of some of the interior walls and forming more than one aperture in each of some of the interior walls, creating a plurality of flow paths between the cooling air holes and the effusion cooling holes.

14. The method of claim 9, wherein additively manufacturing includes using laser powder deposition.

15. The method of claim 9, wherein additively manufacturing includes using direct metal laser sintering.

* * * * *